United States Patent [19]
Hamburg et al.

[11] Patent Number: 5,822,979
[45] Date of Patent: Oct. 20, 1998

[54] CATALYST MONITORING USING A HYDROCARBON SENSOR

[75] Inventors: Douglas Ray Hamburg, Bloomfield Hills; Eleftherios Miltiadis Logothetis, Birmingham; Jacobus Hendrik Visser, Farmington Hills; Margherita Zanini-Fisher, Bloomfield, all of Mich.

[73] Assignee: Ford Global Technologies, Inc., Dearborn, Mich.

[21] Appl. No.: 804,861

[22] Filed: Feb. 24, 1997

[51] Int. Cl.[6] ........................................ F01N 3/00
[52] U.S. Cl. ................... 60/274; 60/276; 60/277
[58] Field of Search ............... 60/274, 276, 277, 60/284

[56] References Cited

U.S. PATENT DOCUMENTS

| | | |
|---|---|---|
| 5,265,417 | 11/1993 | Visser et al. . |
| 5,452,576 | 9/1995 | Hamburg et al. . |
| 5,560,200 | 10/1996 | Maus et al. ............................. 60/277 |
| 5,675,967 | 10/1997 | Ries-Mueller ............................. 60/274 |
| 5,727,383 | 3/1998 | Yamashita et al. ....................... 60/276 |

*Primary Examiner*—Thomas E. Denion
*Attorney, Agent, or Firm*—Peter Abolins

[57] ABSTRACT

A hydrocarbon sensor measures the tail pipe hydrocarbon concentration emitted by an internal combustion engine to determine whether a catalyst has deteriorated beyond a predetermined point with respect to reducing hydrocarbon emissions. Catalyst performance is measured following an engine cold start when hydrocarbons are emitted and compared to catalyst performance when operating temperature has been reached to determine catalyst efficiency.

3 Claims, 2 Drawing Sheets

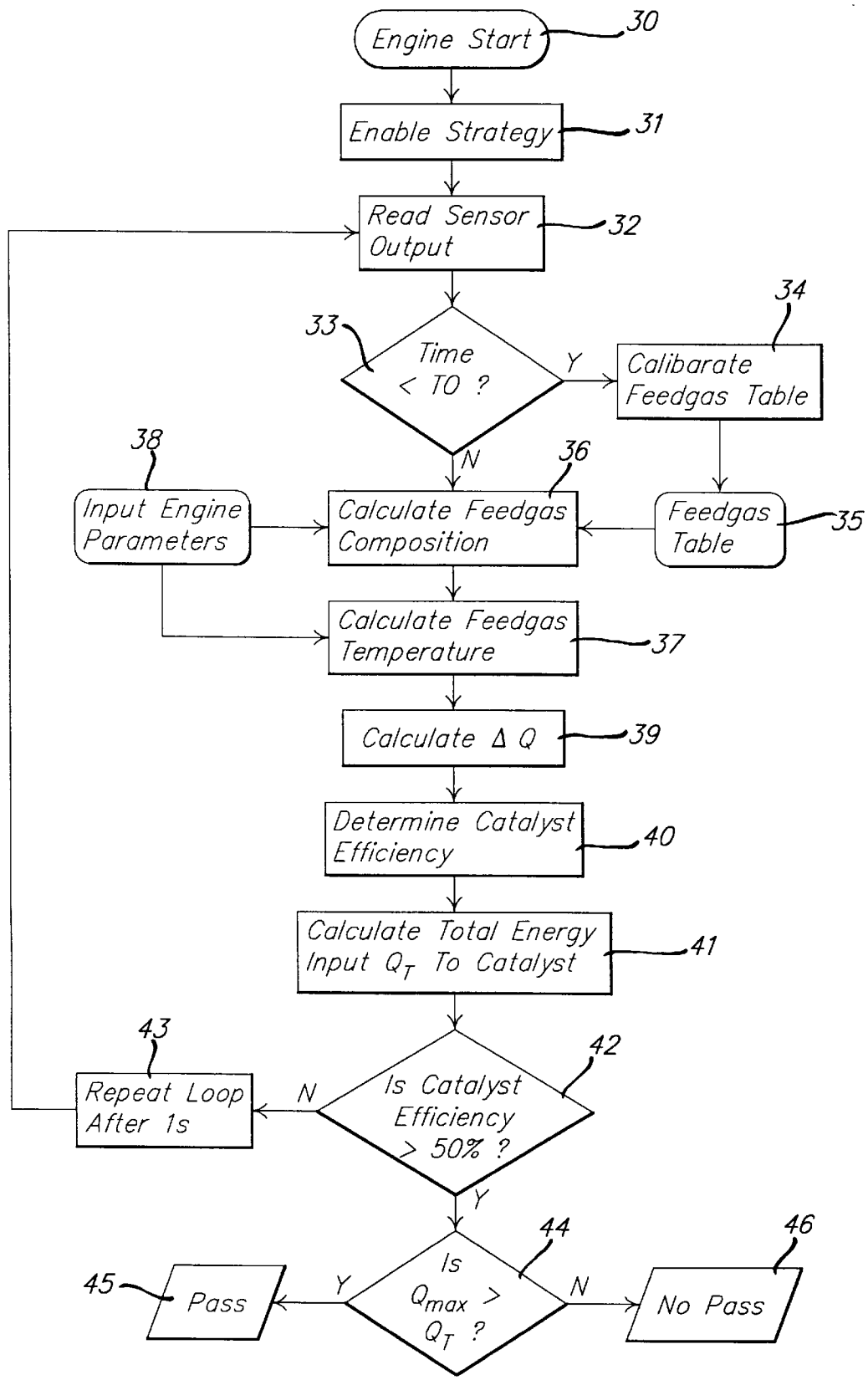

CATALYST MONITORING USING A HYDROCARBON SENSOR

BACKGROUND OF THE INVENTION

1. Field of the Invention

This invention disclosure relates to the use of a hydrocarbon sensor to determine catalyst light-off performance.

2. Prior Art

The on-board diagnostic regulations mandated by various governmental agencies require that the malfunction indicator light (MIL) is turned on when the hydrocarbon (HC) emission levels from a vehicle exceed 1.5 times the standard due to catalyst deterioration. In vehicles that meet LEV (low emission vehicle) and ULEV (ultra low emission vehicle) emission requirements, the fraction of HC emissions occurring during cold-start is a substantial portion of the overall emissions. In these applications, the catalyst is located very close to the exhaust manifold so that it can warm up and become active in a very short time after engine start. However, if the light-off temperature of the catalyst increases with aging or its efficiency for catalyzing HC decreases, a higher fraction of emissions will be produced at cold-start and the overall emission levels will be surpassed.

It is known to monitor catalyst efficiency for CAA (California Air Act) and TLEV (transitional low emission vehicle) applications using the assumption that loss of oxygen storage in the catalyst correlates with the loss of hydrocarbon conversion efficiency. In this known method, two HEGO (heated exhaust gas oxygen) sensors, one upstream and one downstream of the catalyst, are employed to detect the oxygen storage capability of the catalyst. This dual-oxygen sensor method to infer catalyst efficiency has the disadvantage of not being a direct measurement of hydrocarbon conversion efficiency of the catalyst, and small shifts in calibration may cause the MIL (malfunction indicator light) to turn on for catalysts that actually have an acceptable conversion efficiency range. Furthermore, this monitoring strategy is only reliable when the exhaust flow is high and the whole exhaust system, including the sensors, is fully warmed up. Because of these limitations, the dual-oxygen sensor method for detecting catalyst deterioration is not suitable for use with systems designed for ULEV and lower emission levels. These are some of the problems this method overcomes.

SUMMARY OF THE INVENTION

The present invention describes a novel method to infer catalyst deterioration in terms of amount of energy transferred from the exhaust gas to the catalyst before light-off is achieved. Light-off is determined by comparing the inferred HC feedgas composition with that measured by an HC sensor located downstream of the catalyst. This new method is suitable for use with systems designed for ULEV and lower emission levels.

In particular, an internal combustion engine has a system for monitoring the performance of a catalyst, which includes a sensor positioned downstream of the catalyst for providing a first signal related to the hydrocarbon concentration of the exhaust gas before the catalyst reaches operating temperature, and a second signal related to the hydrocarbon concentration of the exhaust gas after the catalyst reaches operating temperature. The system also includes an engine control means for comparing the first and second electronic signals and determining the functionality of a catalyst.

BRIEF DESCRIPTION OF THE DRAWINGS

FIG. 3 is a flow chart for catalyst monitoring using a fast hydrocarbon sensor in accordance with an embodiment of this invention.

DETAILED DESCRIPTION OF THE INVENTION

Figure 1:
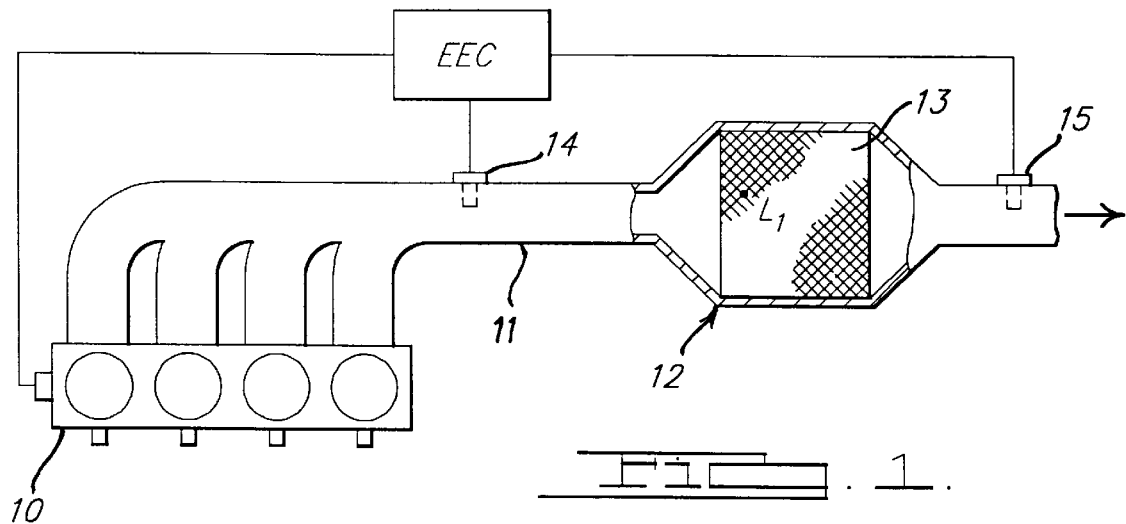
FIG. 1 is a schematic diagram of an engine and catalyst including a catalyst monitoring system in accordance with an embodiment of this invention.

Referring to FIG. 1, exhaust gas travels through an exhaust manifold 10 and continues through an exhaust system 11 to a catalytic converter 12 containing a catalyst 13 carrying energy in the form of heat and chemical energy stored as unburned species. Upstream of catalytic converter 12 is a HEGO sensor 14. Downstream of catalytic converter 12 is a hydrocarbon sensor 15, which is advantageously fast with respect to engine operation. Catalyst 13 is heated by the hot gas until it is warm enough to catalyze the oxidation of carbon monoxide present in the exhaust, thus generating additional heat. At this point, the temperature throughout catalyst 13 increases rapidly and the HC oxidation efficiency becomes greater than 50%.

Figure 2A:
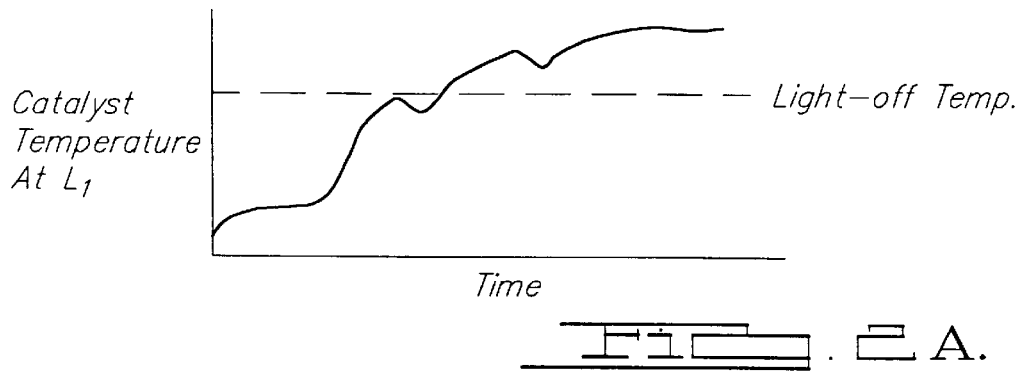
FIG. 2A is a graphical representation of catalyst temperature versus time.
Figure 2B:
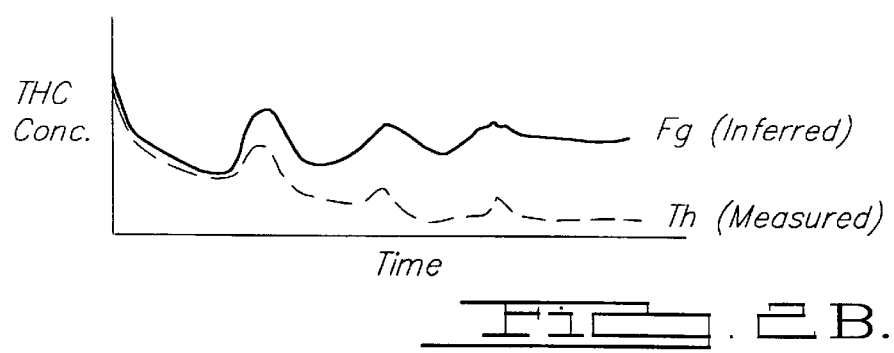
FIG. 2B is a graphical representation of THC (total hydrocarbon) concentration versus time.
Figure 2C:
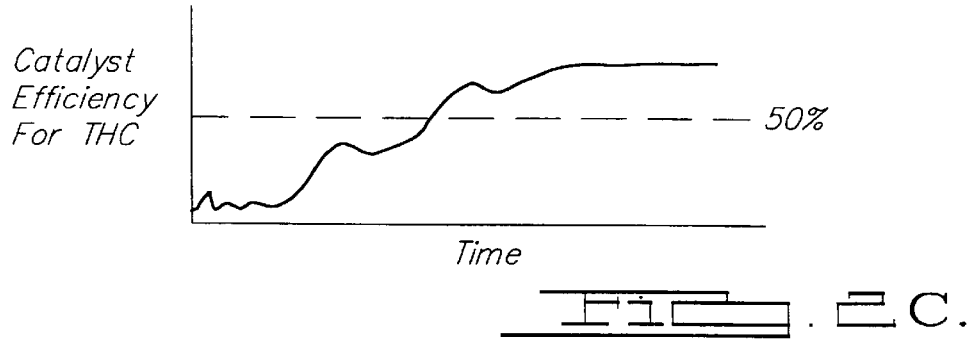
FIG. 2C is a graphical representation of catalyst efficiency for THC (total hydrocarbon) concentration versus time.

FIG. 2A shows graphically how the temperature of catalyst 13 at position $L_1$, in catalyst 13, increases with time. When the front portion of catalyst 13 reaches a certain temperature, additional heat is generated in catalyst 13 due to CO oxidation. The resulting temperature increase enhances the HC oxidation, and HC sensor 15 located downstream of catalyst 13 starts seeing an overall reduced HC concentration. FIG. 2B graphically shows the reduction of the total hydrocarbon concentration of catalyst 13 at position $L_1$ decreasing with time. The calculated catalyst efficiency light-off, defined as the point where catalyst efficiency surpasses 50%, for example, for HC reduction, is achieved after a certain amount of energy $Q_t$ is transferred from the feedgas to catalyst 13. This energy value can be used as a parameter to assess the light-off performance of a catalyst. FIG. 2C graphically shows the catalyst efficiency for the total hydrocarbon concentration over time. The amount of energy $Q_t$ for a deteriorated catalyst is higher than that for a fresh one because the temperature at which light-off occurs becomes higher as the catalyst deteriorates sufficiently to induce emission levels higher than 1.5 times the standard. Referring to FIG. 3, the catalyst monitoring system using hydrocarbon sensor 15 begins at a block 30 wherein the engine is started. Logic flow from block 30 goes to a block 31 wherein the strategy is enabled. Logic flow then goes to a block 32 where hydrocarbon sensor 15 output is read. Logic flow then goes to a decision block 33 wherein it is determined if the time since engine start is less than time $T_0$. If less, logic flow goes to a block 34 wherein HC/CO feedgas table is calibrated. Logic flow then goes to a block 35 which reestablishes the feedgas table and then logic flow goes to a block 36 where the composition of the feedgas is calculated. If at decision block 33 the time is not less than $T_0$, logic flow directly goes to block 36. Logic flow from block 36 goes to a block 37 where in the feedgas temperature is calculated. Block 36 and block 37 both receive inputs from a block 38 providing input engine parameters. Logic flow from block 37 goes to a block 39, wherein the energy input into the catalyst during the period before the catalyst is lit off, $\Delta Q$, is calculated. Logic flow then goes to a block 40 wherein the catalyst efficiency is determined. Logic flow then goes to a block 41, wherein the total energy input to the catalyst $Q_t$, is calculated. From block 41 logic flow goes to a decision block 42 where it is asked if the catalyst efficiency is greater than 50%. If no, then logic flow goes to a block 43 wherein the logic flow is repeated after one second and logic flow goes back to block 32. If at decision block 42 it is determined that the catalyst efficiency is greater than 50%, then logic flow goes to another decision block 44 wherein it is asked if $Q_{max}$, the value which corresponds to the performance of a catalyst that has deteriorated sufficiently to induce emission levels higher than 1.5 times the standard, is greater than the $Q_t$. If yes, the catalyst has passed is indicated at block 45. If no, the catalyst has not passed is indicated at block 46.

The flow diagram shown in FIG. 3 illustrates the strategy used to determine $Q_t$. After the engine is started in block 30 and the A/F is closely controlled by the strategy, a control loop is started which is updated, for instance, every second. The logic flow in this control loop begins in block 32 by reading the output of a HC sensor located downstream of the catalyst. A fast HC sensor, such as the poly-Si based microcalorimeter described in U.S. Pat. No. 5,451,371, is desirable for this application. This particular sensor becomes operational in less than a second from power-up, and has an estimated response time of one second. The HC sensor output is then compared with the feedgas composition in block 36 read from a table of calibrated values for HC and CO feedgas levels as a function of engine RPM, load, spark, and coolant temperature in block 38. The A/F value is assumed to be controlled within a certain narrow range by using one of the new strategies. When the time after a cold-start is less than a few seconds, the values stored in the feedgas table in block 35 are scaled to reflect the measured HC values. During this time period, in fact, the catalyst is not yet lit-off, and the measured emission levels are therefore "true" feedgas values. In this way, it is possible to compensate for HC feedgas variability due to variations in engines, gas sensors, etc. Afterwards, the feedgas composition is calculated in block 36 and the feedgas temperature is calculated in block 37 using knowledge of the engine inlet air flow. The conversion efficiency of the catalyst is then determined in block 40 using (1) the gas sensor signal and (2) the HC inferred composition. Next, the total energy input $Q_t$ to the catalyst is updated in block 42. At this point in block 42, if the catalyst efficiency is less than 50% the loop is continued. Otherwise, the functionality of the catalyst is determined in block 44, whereby, $Q_t$ is compared to $Q_{max}$. If $Q_t$ is found to be less than $Q_{max}$ flow proceeds to block 45 and the catalyst is still acceptable. If $Q_t$ is higher, the catalyst is considered not functional, and flow proceeds to block 46 and the MIL indicator is turned on.

Various modifications and variations will no doubt occur to those skilled in the art to which this invention pertains. Such variations which basically rely on the teaching through which this disclosure has advanced the art of properly considered within the scope of this invention.

We claim:

1. A method for monitoring the performance of a catalyst, including:
   providing a first signal related to the hydrocarbon concentration of the exhaust gas before said catalyst reaches operating temperature using a sensor positioned downstream of said catalyst;
   providing a second electronic signal related to the hydrocarbon concentration of the exhaust gas after said catalyst reaches operating temperature using said sensor;
   comparing said first and second electronic signals using an electronic engine control means and determining the functionality of said catalyst;
   determining the efficiency of said catalyst by comparing the hydrocarbon concentration of the feedgas to the hydrocarbon concentration of said catalyst after reaching operating temperature using an electronic engine control means;
   wherein the step of determining the efficiency of the catalyst includes:
   reading said sensor output;
   sensing whether time since engine start is less than a predetermined time value;
   if yes, calibrating a feedgas table;
   if no, calculating the composition of the exhaust before said catalyst reaches operating temperature;
   calculating the temperature of the exhaust before said catalyst reaches operating temperature;
   calculating the energy input into said catalyst before it reaches operating temperature;
   determining catalyst efficiency;
   determining the total energy input into the catalyst;
   determining whether the catalyst is operating above a predetermined efficiency level; and
   determining whether the total energy input into the catalyst is less than a value defined which corresponds to the performance of a catalyst that has deteriorated sufficiently to induce emission levels higher than a standard.

2. A method for monitoring the performance of a catalyst as recited in claim 1 wherein the steps of calculating the exhaust composition and calculating the exhaust temperature include the step of using input engine parameters.

3. A method for monitoring the performance of a catalyst as recited in claim 1 further comprising the step of repeating the steps recited in claim 1 if catalyst efficiency is less than a predetermined efficiency level.

* * * * *